United States Patent
Ogasawara

(10) Patent No.: US 8,902,457 B2
(45) Date of Patent: Dec. 2, 2014

(54) IMAGE PROCESSING APPARATUS AND IMAGE PROCESSING SYSTEM

(75) Inventor: Naruhiko Ogasawara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 159 days.

(21) Appl. No.: 13/337,465

(22) Filed: Dec. 27, 2011

(65) Prior Publication Data

US 2012/0170076 A1 Jul. 5, 2012

(30) Foreign Application Priority Data

Jan. 5, 2011 (JP) ................................. 2011-000844

(51) Int. Cl.
- *H04N 1/32* (2006.01)
- *H04N 1/00* (2006.01)
- *G06K 3/02* (2006.01)

(52) U.S. Cl.
CPC .... *H04N 1/00875* (2013.01); *H04N 2201/3269* (2013.01); *H04N 1/00846* (2013.01); *H04N 1/00241* (2013.01); *H04N 2201/0081* (2013.01); *H04N 2201/3271* (2013.01); *H04N 2201/3205* (2013.01)
USPC .......................... 358/1.15; 358/3.28; 358/505

(58) Field of Classification Search
CPC .......... H04N 1/32144; H04N 1/00326; H04N 2201/3233; G06K 3/02
USPC ...................................................... 358/1.15
See application file for complete search history.

(56) References Cited

U.S. PATENT DOCUMENTS

| | | | | |
|---|---|---|---|---|
| 5,745,253 | A | * | 4/1998 | Muramatsu et al. .......... 358/408 |
| 7,573,594 | B2 | * | 8/2009 | Leslie et al. ................. 358/1.15 |
| 2005/0263583 | A1 | * | 12/2005 | Schlabach et al. ............ 235/379 |
| 2007/0211313 | A1 | * | 9/2007 | Kurokawa et al. ............ 358/498 |
| 2011/0090534 | A1 | * | 4/2011 | Terao ........................... 358/1.15 |

FOREIGN PATENT DOCUMENTS

| | | | | |
|---|---|---|---|---|
| JP | 57-68970 | | 4/1982 | |
| JP | 62-154949 | | 7/1987 | |
| JP | 9-116683 | | 5/1997 | |
| JP | 10254981 | A * | 9/1998 | .............. G06F 19/00 |
| JP | 3412441 | | 3/2003 | |
| JP | 4346130 | | 7/2009 | |

OTHER PUBLICATIONS

Kobayashi et al., JP 10254981A, Sep. 1998 English Language Machine Translation.*

* cited by examiner

*Primary Examiner* — Marivelisse Santiago Cordero
*Assistant Examiner* — Daryl Jackson
(74) *Attorney, Agent, or Firm* — Oblon, Spivak, McClelland, Maier & Neustadt, L.L.P.

(57) ABSTRACT

An image processing apparatus scans an original document, coverts the original document into image data, creates an electronic file based on the image data, records a scanned mark on the scanned original document, and confirms whether the scanned mark is recorded. The scanned mark includes ID information assigned to the image processing apparatus. The electronic file is created when the scanned mark is not recorded on the original document and when the scanned mark including the ID information is recorded on the original document. The electronic file is not created when a scanned mark other than the scanned mark including the ID information assigned to the image processing apparatus is recorded on the original document.

16 Claims, 4 Drawing Sheets

IMAGE PROCESSING APPARATUS AND IMAGE PROCESSING SYSTEM

BACKGROUND OF THE INVENTION

1. Field of the Invention

The present invention relates to an image processing apparatus and an image processing system for scanning an original document and generating image data, and creating an electronic file based on the image data, and more particularly to an image processing apparatus and an image processing system for protecting copyrights of original documents such as cut (disassembled) books.

2. Description of the Related Art

Conventionally, there is known a technology of creating an electronic file of a book, by disassembling a book with a cutting machine, continuously scanning the pages of the book with an image scanning device capable of double-sided scanning, generating image data, and converting the image data into an electronic file format having high portability (such as PDF (Portable Document Format) of Abode).

However, the problem of protecting the copyright of a book arises. Making a personal copy of a book by performing the above method to create an electronic file of the book does not correspond to copyright infringement. Furthermore, it is not illegal to subsequently sell the cut (disassembled) book to a second-hand bookstore. Thus, the act of repeatedly creating electronic files from a cut book that has been resold by net-auction cannot be prevented legally or technically.

Conventionally, there is an image processing apparatus described in patent document 1, as a device for preventing a document that has been scanned once from being scanned again. This image processing apparatus has a function of recording, on a sheet that has been scanned, a special mark indicating that the sheet has been scanned (scanned mark), and a function of determining whether the special mark is recorded when scanning a sheet and preventing the sheet from being scanned if the special mark is recorded.

When a cut book is scanned by this image processing apparatus and the cut book is resold, the cut book can prevented from being scanned again by using this image processing apparatus. Therefore, an electronic file can be prevented from being created again from the cut book that has been resold. However, even in a case of creating personal copies of a book that is not protected by copyright, an electronic file can be created only once. Thus, if the electronic file has been lost or if an electronic file was not successfully created due to an error of the image processing apparatus, no other electronic files could be created if the scanned mark has been applied to the sheet.

Patent Document 1: Japanese Patent No. 3412441

SUMMARY OF THE INVENTION

The present invention provides an image processing apparatus and an image processing system, in which one or more of the above-described disadvantages are eliminated.

A preferred embodiment of the present invention provides an image processing apparatus and an image processing system for repeatedly creating electronic files of an original document such as a book for personal copies, while preventing electronic files from being illegitimately created.

According to an aspect of the present invention, there is provided an image processing apparatus including an original document scanning unit configured to scan an original document and convert the original document into image data; a file creating unit configured to create an electronic file based on the image data; a scanned information recording unit configured to record scanned information on the original document for which the electronic file has been created based on the image data; a scanned information confirming unit configured to confirm whether the scanned information is recorded on the original document; and a control unit configured to control the original document scanning unit, the file creating unit, the scanned information recording unit, and the scanned information confirming unit, wherein the scanned information includes assigned information assigned to the image processing apparatus, the control unit causes the file creating unit to create the electronic file when the scanned information confirming unit confirms that the scanned information is not recorded on the original document and when the scanned information including the assigned information is recorded on the original document, and the control unit does not cause the file creating unit to create the electronic file when the scanned information confirming unit confirms that scanned information other than the scanned information including the assigned information assigned to the image processing apparatus is recorded on the original document.

According to an aspect of the present invention, there is provided an image processing system including a first image processing apparatus and a second image processing apparatus, wherein the first image processing apparatus and the second image processing apparatus each includes an original document scanning unit configured to scan an original document and convert the original document into image data, a file creating unit configured to create an electronic file based on the image data, a scanned information recording unit configured to record scanned information on the original document for which the electronic file has been created based on the image data, a scanned information confirming unit configured to confirm whether the scanned information is recorded on the original document, and a control unit configured to control the original document scanning unit, the file creating unit, the scanned information recording unit, and the scanned information confirming unit, wherein the scanned information includes assigned information assigned to the first image processing apparatus or the second image processing apparatus, the control unit causes the file creating unit to create the electronic file when the scanned information confirming unit confirms that the scanned information is not recorded on the original document and when the scanned information including the assigned information is recorded on the original document, and the control unit does not cause the file creating unit to create the electronic file when the scanned information confirming unit confirms that scanned information other than the scanned information including the assigned information assigned to the first image processing apparatus or the second image processing apparatus is recorded on the original document, wherein an original document on which scanned information is recorded by the first image processing apparatus can be converted into an electronic file by the first image processing apparatus but not by the second image processing apparatus.

According to an aspect of the present invention, there is provided an image processing method performed by a first image processing apparatus and a second image processing apparatus included in an image processing system, the image processing method including scanning an original document and converting the original document into image data; creating an electronic file based on the image data; recording scanned information on the original document for which the electronic file has been created based on the image data; and confirming whether the scanned information is recorded on the original document, wherein the scanned information includes assigned information assigned to the first image processing apparatus or the second image processing apparatus, the electronic file is created when it is confirmed that the scanned information is not recorded on the original document and when it is confirmed that the scanned information including the assigned information, which is assigned to the first image processing apparatus or the second image processing apparatus performing the image processing method, is recorded on the original document, and the electronic file is not created when it is confirmed that scanned information other than the scanned information including the assigned information assigned to the first image processing apparatus or the second image processing apparatus performing the image processing method, is recorded on the original document, wherein an original document on which scanned information is recorded by the first image processing apparatus can be converted into an electronic file by the first image processing apparatus but not by the second image processing apparatus.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

Figure 1:
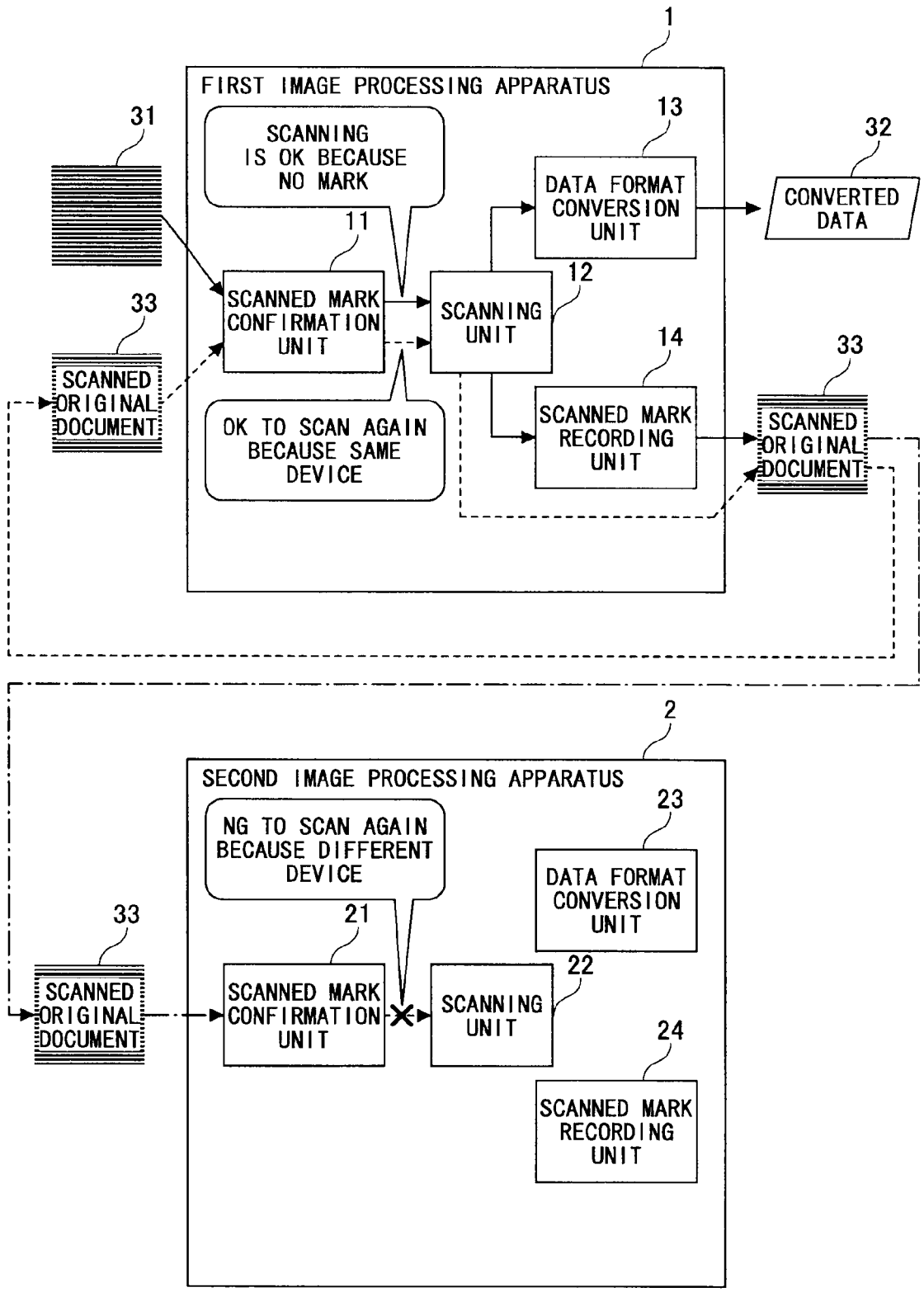
FIG. 1 illustrates a schematic configuration and a usage mode of an image processing apparatus according to an embodiment of the present invention.

FIG. 1 illustrates a schematic configuration and a usage mode of an image processing apparatus according to an embodiment of the present invention.

As illustrated in FIG. 1, a first image processing apparatus 1 includes a scanned mark confirmation unit 11, a scanning unit 12, a data format conversion unit 13, and a scanned mark recording unit 14. A second image processing apparatus 2 includes a scanned mark confirmation unit 21, a scanning unit 22, a data format conversion unit 23, and a scanned mark recording unit 24. In the first image processing apparatus 1 and the second image processing apparatus 2, the elements having the same names have the same functions. That is to say, the first image processing apparatus 1 and the second image processing apparatus 2 have the same configuration.

In the first image processing apparatus 1, the scanned mark confirmation unit 11 confirms whether an original document that is set has a scanned mark (a mark indicating that the original document has been scanned), and if there is a scanned mark, the scanned mark confirmation unit 11 confirms whether the scanned mark had been recorded by the scanned mark recording unit 14. The scanned mark confirmation unit 11 sends information indicating the confirmation results and the original document to the scanning unit 12.

If the input original document does not have a scanned mark or if the original document has a scanned mark that has been recorded by the scanned mark recording unit 14, the scanning unit 12 scans the original document. If the input original document has a scanned mark that has not been recorded by the scanned mark recording unit 14, the scanning unit 12 does not scan the original document.

The scanning unit 12 scans the original document converts the original document into image data, and outputs the image data to the data format conversion unit 13. The data format conversion unit 13 converts the image data into a file having a predetermined format (for example, PDF).

The scanning unit 12 sends the original document that has been scanned to the scanned mark recording unit 14. The scanned mark recording unit 14 records, on the original document that has been scanned, a scanned mark indicating that the original document has been processed (scanned and converted into an electronic file) by the first image processing apparatus 1. Specific examples of the scanned mark are described below.

The scanned mark confirmation unit 21, the scanning unit 22, the data format conversion unit 23, and the scanned mark recording unit 24 of the second image processing apparatus 2 operate in the same manner as the scanned mark confirmation unit 11, the scanning unit 12, the data format conversion unit 13, and the scanned mark recording unit 14 of the first image processing apparatus 1.

A description is given of operations of the first image processing apparatus 1 and the second image processing apparatus 2 having the above configuration. The scanned mark confirmation unit 11 of the first image processing apparatus 1 confirms whether an original document 31 that is set has a scanned mark, and sends information indicating the confirmation result and the original document 31 to the scanning unit 12.

The original documents 31 are the body of a book that has been disassembled by a cutting machine (not shown), and do not have a scanned mark. Therefore, the scanning unit 12 scans the original document 31 and converts the original document 31 into image data, sends the image data to the data format conversion unit 13, and sends the original document 31 to the scanned mark recording unit 14.

The data format conversion unit 13 converts the image data of the original document 31 into a predetermined format, and attains converted data 32. The scanned mark recording unit 14 records the scanned mark on the original document 31, and attains a scanned original document 33.

When the scanned original document 33 is set in the first image processing apparatus 1, the scanned mark confirmation unit 11 confirms that the scanned original document 33 has a scanned mark indicating that the scanned original document 33 had been processed by itself (by the first image processing apparatus 1).

Based on this result, the scanning unit 12 scans the scanned original document 33 again, and converts the original document 33 into image data. Furthermore, the data format conversion unit 13 creates the converted data 32 from this image data. However, the scanned mark recording unit 14 does not record a scanned mark on the scanned original document 33 again.

When the scanned original document 33 is set in the second image processing apparatus 2, the scanned mark confirmation unit 21 confirms that the scanned original document 33 has a scanned mark indicating that the scanned original document 33 had been scanned by a device other than itself (by a device other than the second image processing apparatus 2). Based on this result, the scanning unit 22 does not scan the scanned original document 33.

As described above, the first image processing apparatus 1 that had first processed the original document 31 can repeatedly process the original document 31 (scanned original document 33). However, image processing apparatuses other than the first image processing apparatus 1 cannot process the original document 31. Therefore, the first image processing apparatus 1 can repeatedly create electronic files from a book, but other image processing apparatuses are prevented from creating electronic files from the book.

Configuration of Image Processing Apparatus

Figure 2:
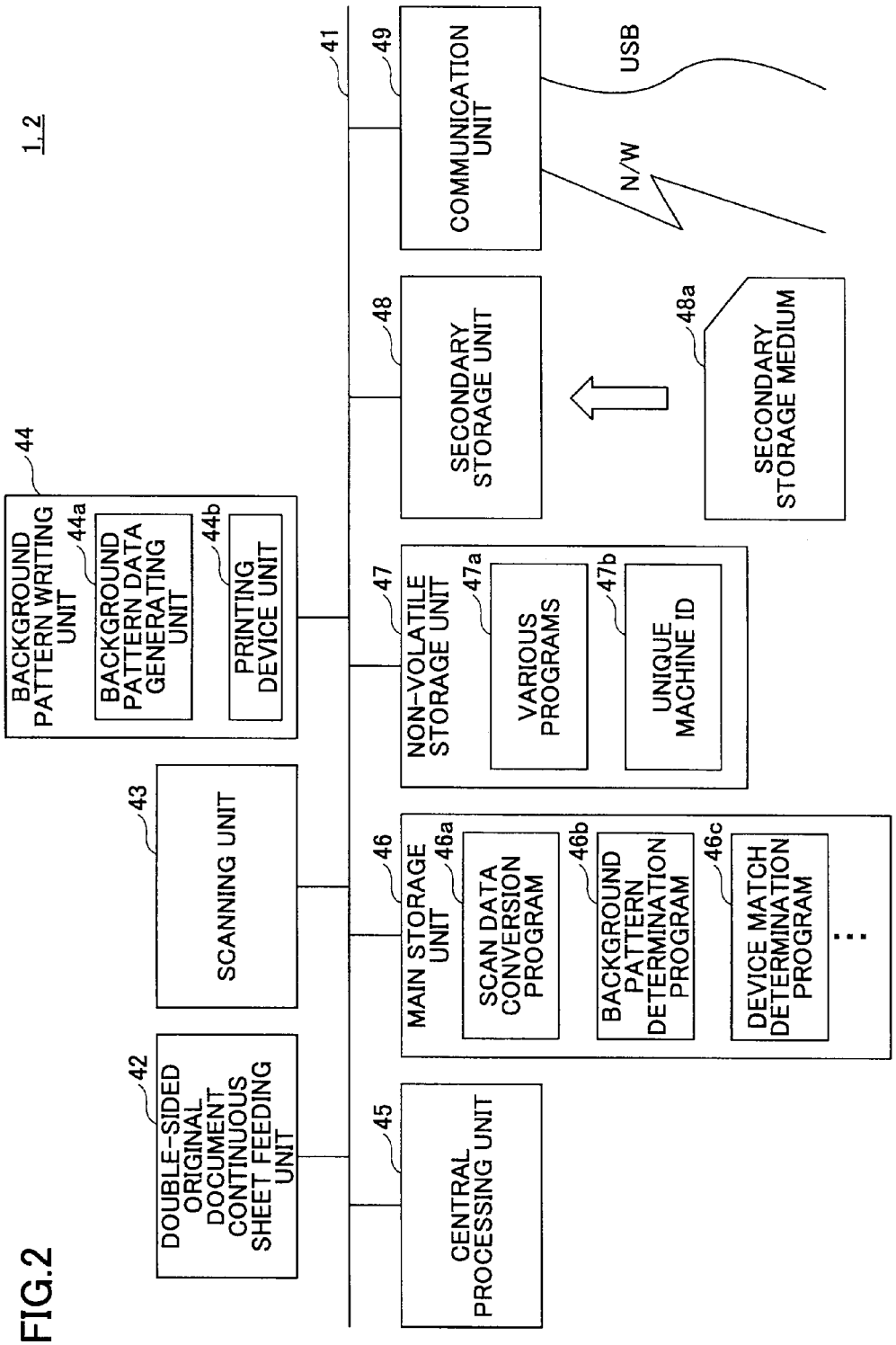
FIG. 2 is a hardware block diagram of the image processing apparatus according to an embodiment of the present invention.

FIG. 2 is a hardware block diagram of the first image processing apparatus 1 and the second image processing apparatus 2. As shown in FIG. 2, the first image processing apparatus 1 and the second image processing apparatus 2 include a double-sided original document continuous sheet feeding unit 42, a scanning unit 43, a background pattern writing unit 44, a central processing unit (CPU) 45, a main storage unit 46, a non-volatile storage unit 47, a secondary storage unit 48, and a communication unit 49, which are connected by a bus 41. Furthermore, although not shown, there is also a display unit including an operations unit including various buttons and a LCD (Liquid Crystal Display).

The double-sided original document continuous sheet feeding unit 42 is an ADF (Automatic Document Feeder), which can continuously convey both sides of plural original documents to the scanning unit 43. The scanning unit 43 converts the images of the original documents into image data processable by the central processing unit 45. The background pattern writing unit 44 is positioned in an original document conveyance path behind the scanning unit 43, and prints a background pattern generated at a background pattern data generating unit 44*a* onto the original document at a printing device unit 44*b*. The background pattern which cannot be recognized as an electronic watermark is embedded based on predetermined information.

The central processing unit 45 controls the overall image processing apparatus. The main storage unit 46 temporarily stores various programs such as a scan data conversion program 46*a*, a background pattern determination program 46*b*, and a device match determination program 46*c*, as well as image data generated at the scanning unit 43.

The scan data conversion program 46*a* has a function of converting image data generated at the scanning unit 43 into data having a format such as JPEG (Joint Photographic Experts Group), PNG (Portable Network Graphics), and PDF. The background pattern determination program 46*b* has a function of analyzing image data of an original document generated at the scanning unit 43 and reading the information written in the background pattern of the original document. The device match determination program 46*c* has a function of comparing the device information included in the information read by the background pattern determination program 46*b* with a unique machine ID described below.

The non-volatile storage unit 47 is a flash ROM (Read-Only Memory), and includes a group of various programs 47*a* and a unique machine ID 47*b*. The group of programs may be stored in a secondary storage medium 48*a* described below.

The secondary storage unit 48 reads/writes data from the secondary storage medium 48*a* such as a Secure Digital (SD) card. The image data that has been generated and converted into an electronic file at the scanning unit 43 may be stored in the secondary storage medium 48*a*.

The communication unit 49 includes an external connection I/F (interface) such as a network I/F and a USB (Universal Serial Bus) I/F. Image data may be exchanged with an external device through these interfaces.

Operation of Image Processing Apparatus

Figure 3:
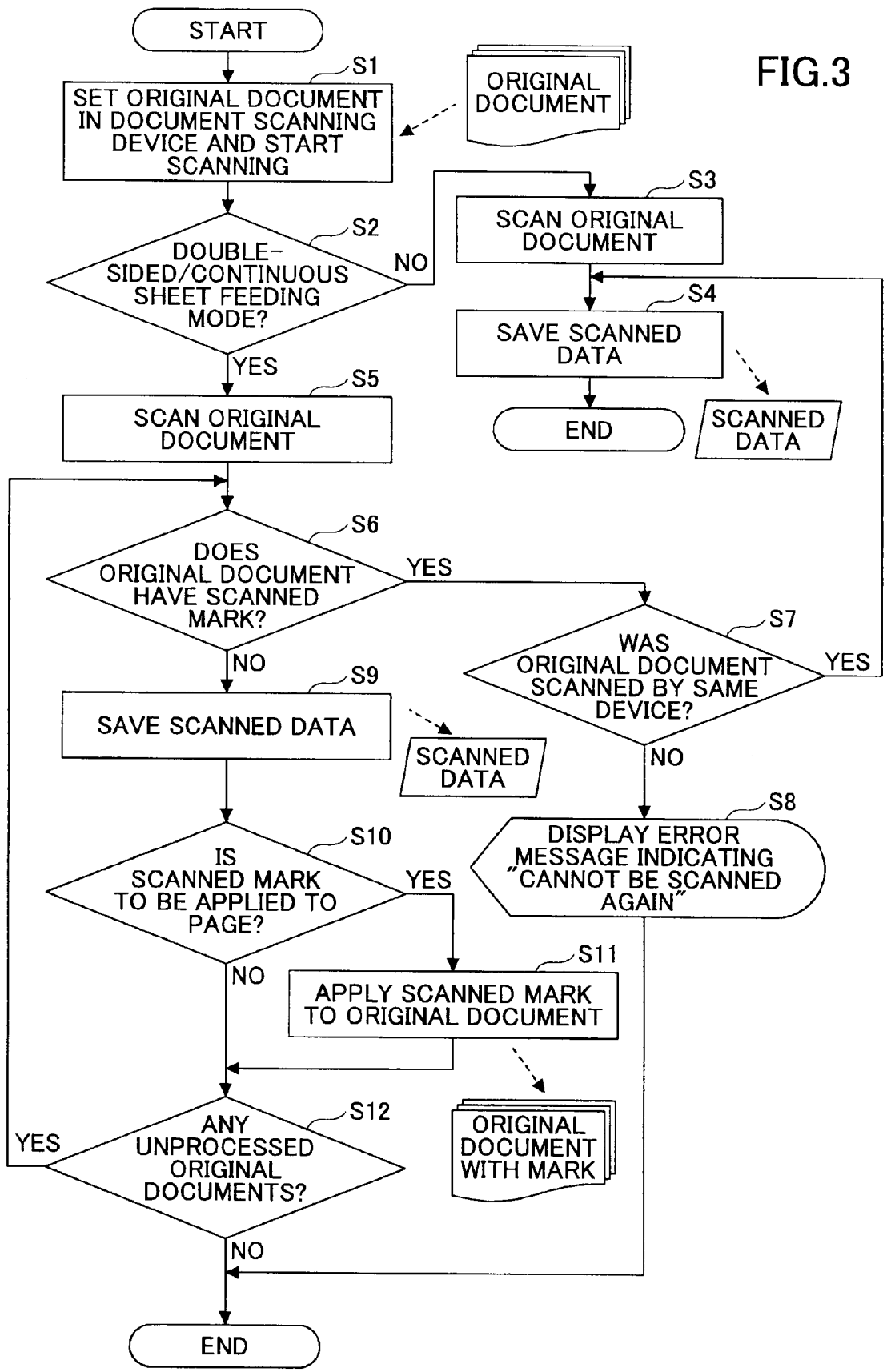
FIG. 3 is a flowchart indicating operations of the image processing apparatus according to an embodiment of the present invention.

FIG. 3 is a flowchart indicating operations of the image processing apparatus according to an embodiment of the present invention. With reference to FIG. 3, a description is given of operations of the image processing apparatus according to an embodiment of the present invention.

In step S1, an original document is set in the double-sided original document continuous sheet feeding unit 42. According to need, various settings are made (such as determining whether the original document has images on both sides), and a start operation process is performed. The double-sided original document continuous sheet feeding unit 42 may be configured to automatically detect whether there are images on both sides of the original document, or the double-sided original document continuous sheet feeding unit 42 may be pre-set to detect whether there are images on both sides of the original document. As long as the image processing apparatus recognizes whether there are images on both sides of the original document, either configuration is applicable.

In step S2, it is checked whether the image processing apparatus is in a double-sided/continuous sheet feeding mode. If the image processing apparatus is not in a double-sided/continuous sheet feeding mode (NO in step S2), the process proceeds to step S3, and the original document is scanned in a regular mode. Next, in step S4, the data obtained by the scanning process is converted into an electronic file, and the flow of FIG. 3 ends. If the body of a book is to be scanned, it is unlikely that only one page is scanned or only one side of a page is scanned. Therefore, in these cases, it is assumed that the processes to be performed on the body of a book described below (steps S6 through S12) are unnecessary. Accordingly, these processes are bypassed, and the flow is ended after performing the regular scanning process on the original document. However, the image processing apparatus may be set to always perform steps S5 through S12 without performing steps S2 through S4. At the process of scanning the original document in step S3, the image data (scanned data) generated at the scanning unit 43 is temporarily stored in the main storage unit 46. At the process of converting the scanned data into an electronic file in step S4, the scanned data is converted into an electronic file of a predetermined format, and then the electronic file is transferred to the secondary storage unit 48 and saved in the secondary storage medium 48*a*.

When the image processing apparatus is in a double-sided/continuous sheet feeding mode (YES in step S2), the process proceeds to step S5 and the original document is scanned. Next, in step S6, it is determined whether the original document set in step S1 has a scanned mark. At this step, the background pattern determination program 46*b* analyzes the image data stored in the main storage unit 46 to determine whether the original document has a scanned mark.

When the original document has a scanned mark (YES in step S6), the process proceeds to step S7, and it is determined whether the scanned mark had been applied when the original document was processed in the same image processing apparatus (step S7). In this step, the device match determination program 46*c* compares the machine information included in the background pattern data read by the background pattern determination program 46*b* with the unique machine ID 47*b* stored in the non-volatile storage unit 47, and determines whether they match.

When the scanned mark had been applied when the original document was processed in the same image processing apparatus (YES in step S7), the process proceeds to step S4, the image data created by the scanning process in step S5 is converted into an electronic file, and the process ends. If this process is being performed again in the same image processing apparatus, it is recognized that this process is being performed because the electronic file had been lost or the process of converting the image data into an electronic file had been unsuccessful. Therefore, the process is not prevented from being performed, and the scanned data is converted into an electronic file in step S4.

Meanwhile, when the scanned mark had been applied when the original document was processed in another image processing apparatus (NO in step S7), the process proceeds to step S8, and an error message indicating "the original document cannot be scanned again", and the flow of FIG. 3 ends. The process of step S8 is performed when it is determined that the process to be executed on the original document is an inappropriate process that is not supposed to be performed again (for example, the process of scanning a disassembled book that has been resold at a net auction and creating an electronic file from the scanned images).

When the original document does not have a scanned mark (NO in step S6), the process proceeds to step S9, and the image data created by the scanning process in step S5 is converted into an electronic file. Next, the process proceeds to step S10, and it is determined whether the original document converted into an electronic file is a page on which a scanned mark is to be applied. The determination standards are described as follows in a) through e).

a) A scanned mark is applied at intervals of a predetermined number of pages.
b) A scanned mark is applied to a color page, assuming that a color page includes important information.
c) For certain types of books (photo collections and certain types of magazines), color gravure pictures affect the quality of the book. Therefore, when the document is recognized as such a book as a result of performing automatic character string recognition on the scanned data, a scanned mark is applied to a color gravure page.
d) In the case of comic books, a page including large frames is likely to be a climax scene. Therefore, a scanned mark is applied to such a page.
e) When a book includes plural volumes, the number of volumes is recognized by performing automatic character string recognition on the scanned data, and a scanned mark is applied to some of the volumes, such as the first volume, the middle volume, and the final volume.

When it is determined that a scanned mark is not to be applied to the page (NO in step S10), the process proceeds to step S12. When it is determined that a scanned mark is to be applied to the page (YES in step S10), the process proceeds to step S11 and a scanned mark is applied to the original document before proceeding to step S12. In step S11, the background pattern data generating unit 44a in the background pattern writing unit 44 generates background pattern data corresponding to the unique machine ID 47b stored in the non-volatile storage unit 47, and the printing device unit 44b prints the background pattern on the original document.

In step S12, it is determined whether there are any unprocessed original documents. When there is an unprocessed original document (YES in step S12), the process proceeds to step S6. When there are no unprocessed original documents (NO in step S12), it means that all original documents have been processed, and therefore the flow of FIG. 3 ends.

As described above in detail, with the image processing apparatus according to the present embodiment, when there is no existing scanned information (scanned mark) recorded on the original document, and when scanned information including information assigned to the image processing apparatus is recorded on the original document, the original document is converted into an electronic file, but otherwise, the original document is not converted into an electronic file. Therefore, it is possible to create electronic files repeatedly as personal copies of original documents such as a book, while preventing electronic files of a sold book from being created repeatedly.

Furthermore, the double-sided original document continuous sheet feeding unit 42 is provided, and only when the image processing apparatus is in a double-sided/continuous sheet feeding mode, it is confirmed whether scanned information is recorded on the original document. Therefore, the processing target can be easily limited to a book.

In the present embodiment, the following modifications (1) through (3) can be made.

(1) As the background pattern data generated by the background pattern data generating unit 44a, instead of using the unique machine ID 47b, an Internet Protocol (IP) address of an IP network assigned to the communication unit 49 is used. In this case, when plural image processing apparatuses are connected to LAN (Local Area Network) of the same IP segment (such as in an office), another image processing apparatus having the same IP segment information can create an electronic file again.

(2) As the background pattern data generated by the background pattern data generating unit 44a, instead of using the unique machine ID 47b, location information in a directory service is used. In this case, unlike IP segments that are likely to be managed separately from a company's departments, location information is substantially ensured to be managed in terms of departments. Therefore, electronic files can be reliably created again within the same department by using location information, compared to the case of using IP segment information.

(3) Instead of applying a scanned mark with a background pattern that is an electronic watermark, a compact device (Radio Frequency Identification (RFID) tag) with which information can be read/written in a noncontact manner may be attached to the original document (book) in advance, and the scanned information may be recorded in the compact device. This case is disadvantageous in terms of the workload of attaching an RFID tag to the original document in advance, and the cost of the RFID tag. However, there are advantages in that the mechanical structure is simple because the information can be read/written in a non-contact manner, and a large amount of information can be recorded.

Meanwhile, in the case of an electronic watermark, although the mark is thin, the mark needs to be printed onto the original document. Thus, the original document may be damaged because of a paper jam. Furthermore, it may become difficult to read the original document due to the electronic watermark. Nevertheless, an electronic watermark is advantageous in that no particular device needs to be attached to the book in advance.

Furthermore, when an RFID tag is used, the determination of step S10 is unnecessary. That is to say, the book manufacturer can determine the page in which an RFID tag is to be embedded. Therefore, if RFID tags are selectively embedded on the essential pages of the book in advance, when the book is cut (disassembled) and resold, the quality of the book can be significantly degraded (because electronic files cannot be created from the book again). Accordingly, the process of determining whether the original document is a page on which a scanned mark is to be applied of step S10 is unnecessary. By writing scanned information in the RFID tag, a scanned mark is applied to the page having an embedded RFID tag.

Furthermore, when an RFID tag is used, the determination of step S6 can be made only by reading the RFID tag, without the need of scanning the image of the original document (step S5). Therefore, the determination process can be performed quickly.

Image Processing System

Figure 4:
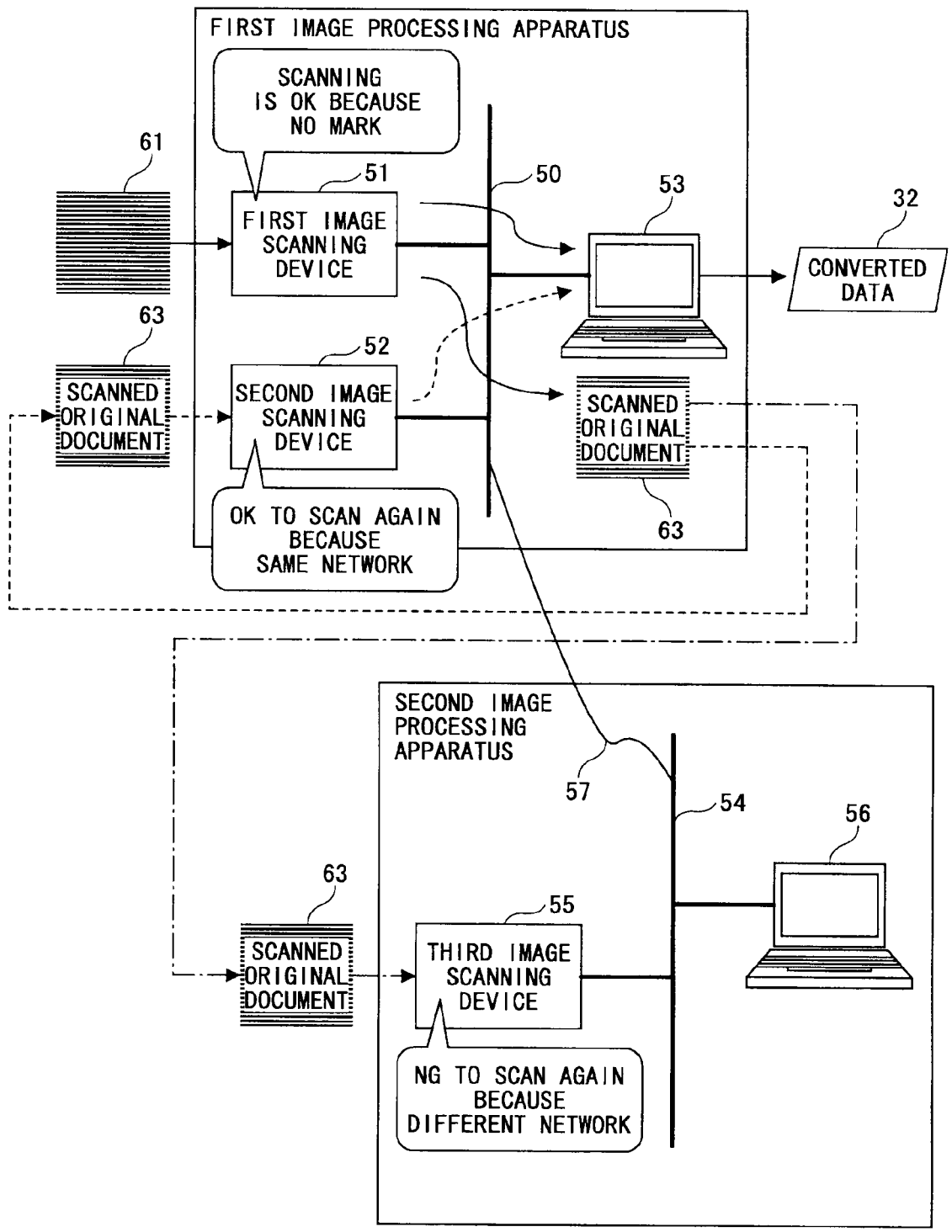
FIG. 4 illustrates a schematic configuration of an image processing system according to an embodiment of the present invention.

FIG. 4 illustrates a schematic configuration of an image processing system according to an embodiment of the present invention.

The image processing system includes a first image processing apparatus including a first image scanning device 51, a second image scanning device 52, and a PC (personal computer) 53, which are respectively connected to a first LAN 50. Furthermore, the image processing system includes a second image processing apparatus including a third image scanning device 55 and a PC 56, which are respectively connected to a second LAN 54. The first LAN 50 and the second LAN 54 are connected by a WAN (wide area network) 57.

The respective image scanning devices have the same configuration as the first image processing apparatus 1 and the second image processing apparatus 2 illustrated in FIG. 1, except that the data format conversion units 13, 23 are excluded. Instead, the PC 53 and the PC 56 have a data format conversion function.

Furthermore, each of the image scanning devices records, in an original document that has been scanned by itself, scanned information including the IP address in the LAN to which the device is connected, with the use of an electronic watermark or an RFID tag described above. That is to say, the first image scanning device 51 and the second image scanning device 52 record scanned information including IP addresses having the same IP segment information. Meanwhile, the third image scanning device 55 records scanned information including an IP address having different IP segment information from that of the first image scanning device 51 and the second image scanning device 52.

A description is given of an example of an operation of the image processing system having the above configuration.

A user sets, in the first image scanning device 51, an original document 61 of the body of a book that has not been scanned. The user instructs a scanning operation from an operation unit of the first image scanning device 51 or from the PC 53. The first image scanning device 51 scans the original document 61 upon confirming that a scanned mark is not applied. Then, the first image scanning device 51 sends the image data generated based on the original document 61 to the PC 53 through the first LAN 50, and applies a scanned mark to the scanned original document 61, so that the original document 61 is turned into a book body with scanned mark (scanned original document) 63 (path indicated by arrows with solid lines). The PC 53 converts the received image data into a predetermined format, so that converted data 62 is attained.

Next, the user sets the book body with scanned mark 63 in the second image scanning device 52, and instructs a scanning operation from an operation unit of the second image scanning device 52 or from the PC 53. The second image scanning device 52 scans the book body with scanned mark 63 upon confirming that the IP segment information of the IP address assigned to itself matches the IP segment information of the IP address included in the scanned mark applied to the book body with scanned mark 63. Then, the second image scanning device 52 sends the image data generated based on the book body with scanned mark 63 to the PC 53 through the first LAN 50 (path indicated by arrows with dotted lines). The PC 53 converts the received image data into a predetermined format, so that the converted data 62 is attained. The book body with scanned mark 63 already has a scanned mark, and therefore the second image scanning device 52 does not apply a scanned mark again.

Meanwhile, the user sets the book body with scanned mark 63 in the third image scanning device 55, and instructs a scanning operation from an operation unit of the third image scanning device 55 or from the PC 56. The third image scanning device 55 confirms that the IP segment information of the IP address assigned to itself does not match the IP segment information of the IP address included in the scanned mark applied to the book body with scanned mark 63. Then, the third image scanning device 55 displays an error message indicating that "the original document cannot be scanned again" on a display unit (if any) of the third image scanning device 55 or on a display unit of the PC 56.

As described above, with the image processing system according to an embodiment of the present invention, an original document can be repeatedly scanned by any of the image scanning devices connected to the same LAN if the original document had been scanned by any of the image scanning devices connected to the same LAN. Meanwhile, the original document is prevented from being scanned by an image scanning device connected to a different LAN.

In an image processing apparatus according to an embodiment of the present invention, an original document is converted into an electronic file when scanned information is not recorded on the original document and when scanned information including assigned information assigned to the image processing apparatus is recorded on the original document, and an original document is not converted into an electronic file when scanned information other than the scanned information including the assigned information assigned to the image processing apparatus is recorded on the original document.

According to an aspect of the present invention, an image processing apparatus and an image processing system are provided, which are capable of repeatedly creating electronic files of an original document such as a book as personal copies, while preventing electronic files from being illegitimately created.

The present invention is not limited to the specific embodiments described herein, and variations and modifications may be made without departing from the scope of the present invention.

The present application is based on Japanese Priority Patent Application No. 2011-000844, filed on Jan. 5, 2011, the entire contents of which are hereby incorporated herein by reference.

What is claimed is:

1. An image processing apparatus comprising:
an original document scanning unit configured to scan an original document and convert the original document into image data;
a file creating unit configured to create an electronic file based on the image data;
a scanned information recording unit configured to record scanned information on the original document, the scanned information including machine information that indicates a device by which the original document is scanned;
a scanned information confirming unit configured to confirm whether the scanned information is recorded on the original document;
a determining unit configured to determine whether the scanned information confirmed by the scanned information confirming unit includes the machine information; and a control unit configured to control the original document scanning unit, the file creating unit, the scanned information recording unit, the scanned information confirming unit and the determining unit, wherein the control unit causes the file creating unit to create the electronic file when the scanned information confirming unit confirms that the scanned information is not recorded on the original document, the control unit causes the file creating unit to create the electronic file when the scanned information confirming unit confirms that the scanned information is recorded on the original document and the determining unit determines that the machine information indicates the device that scanned the original document is the image processing apparatus, and the control unit does not cause the file creating unit to create the electronic file when the scanned information confirming unit confirms that the scanned information is recorded on the original document and the determining unit determines that the machine information indicates the device that scanned the original document is not the image processing apparatus.

2. The image processing apparatus according to claim 1, wherein the original document scanning unit is further configured to function in a mode by continuously scanning both sides of plural original documents, and the control unit is further configured to control the scanned information confirming unit to confirm whether the scanned information is recorded, and control the file creating unit to create the electronic file based on a confirmation result of the scanned information confirming unit when the original document scanning unit is in the mode.

3. The image processing apparatus according to claim 1, wherein the machine information includes identification information that is unique to the image processing apparatus when the device that scanned the original documents is the image processing apparatus.

4. The image processing apparatus according to claim 3, wherein the control unit does not cause the file creating unit to create the electronic file when identification information is not unique to the image processing apparatus.

5. The image processing apparatus according to claim 1, wherein the image processing apparatus is connected to an IP network, and the machine information includes IP segment information of the IP network when the device that scanned the original documents is the image processing apparatus.

6. The image processing apparatus according to claim 1, wherein the image processing apparatus is managed by a directory service, and the machine information includes location information of the directory service when the device that scanned the original documents is the image processing apparatus.

7. The image processing apparatus according to claim 1, wherein the scanned information recording unit records the scanned information by using an electronic watermark.

8. The image processing apparatus according to claim 1, wherein the scanned information recording unit records the scanned information in an electronic tag that is attached to the original document in advance.

9. The image processing apparatus according to claim 1, further comprising:

a page selecting unit configured to select a page of the original document on which the scanned information is to be recorded, wherein the scanned information recording unit records the scanned information only on the page selected by the page selecting unit.

10. The image processing apparatus according to claim 9, wherein the page selecting unit selects pages at intervals of a predetermined number of pages of original documents that have been scanned.

11. The image processing apparatus according to claim 9, wherein the page selecting unit selects the page including image data of a scanned original document having a predetermined characteristic.

12. The image processing apparatus according to claim 9, wherein when the original document is obtained by disassembling books including plural volumes, the page selecting unit selects one or more of the plural volumes.

13. The image processing apparatus according to claim 1, wherein the control unit causes the scanned information recording unit to record the scanned information including the machine information on the original document when the scanned information confirming unit confirms that the scanned information is not recorded on the original document.

14. An image processing system comprising:
a first image processing apparatus; and
a second image processing apparatus, wherein
the first image processing apparatus and the second image processing apparatus each includes:
an original document scanning unit configured to scan an original document and convert the original document into image data;
a file creating unit configured to create an electronic file based on the image data;
a scanned information recording unit configured to record scanned information on the original document, the scanned information including machine information that indicates that the original document is scanned by a particular one of the first image processing apparatus and the second image processing apparatus;
a scanned information confirming unit configured to confirm whether the scanned information is recorded on the original document;
a determining unit configured to determine whether the scanned information confirmed by the scanned information confirming unit includes the machine information; and
a control unit configured to control the original document scanning unit, the file creating unit, the scanned information recording unit, the scanned information confirming unit and the determining unit, wherein
the control unit causes the file creating unit to create the electronic file when the scanned information confirming unit confirms that the scanned information is not recorded on the original document,
the control unit causes the file creating unit to create the electronic file when the scanned information confirming unit confirms that the scanned information is recorded on the original document and the determining unit determines that the machine information indicates that the original document is scanned by the first image processing apparatus,
the control unit does not cause the file creating unit to create the electronic file when the scanned information confirming unit confirms that the scanned information is recorded on the original document and the determining unit determines that the machine information indicates that the original document is scanned by the second image processing apparatus, and when the scanned information is recorded by the first image processing apparatus on the original document, the original document is convertible into an electronic file by the first image processing apparatus but not by the second image processing apparatus.

15. The image processing system according to claim 14, wherein the first image processing apparatus and the second image processing apparatus are connected to IP networks of different segments, and the first image processing apparatus and the second image processing apparatus respectively record scanned information including segment information of the corresponding IP network.

16. An image processing method performed by a first image processing apparatus and a second image processing apparatus included in an image processing system, the image processing method comprising:

scanning an original document and converting the original document into image data;

creating an electronic file based on the image data;

recording scanned information on the original document, the scanned information including machine information that indicates that the original document is scanned by a particular one of the first image processing apparatus and the second image processing apparatus;

confirming whether the scanned information is recorded on the original document;

determining whether the scanned information that was confirmed includes the machine information;

creating the electronic file when the scanned information is not recorded on the original document;

creating the electronic file when the scanned information is recorded on the original document and the machine information indicates that the original document is scanned by the first image processing apparatus; and creating the electronic file when the scanned information is recorded on the original document and the machine information indicates that the original document is scanned by the second image processing apparatus, wherein when the scanned information is recorded by the first image processing apparatus on the original document, the original document is convertible into an electronic file by the first image processing apparatus but not by the second image processing apparatus.

* * * * *